(12) United States Patent
Kim (10) Patent No.: US 12,026,538 B2
(45) Date of Patent: Jul. 2, 2024

(54) DISTRIBUTED AND ASSOCIATIVE CONTAINER PLATFORM SYSTEM

(71) Applicants: ACORNSOFT CO., LTD., Seoul (KR); Jin Bum Kim, Seoul (KR)

(72) Inventor: Jin Bum Kim, Seoul (KR)

(73) Assignees: ACORNSOFT CO., LTD., Seoul (KR); Jin Bum Kim, Seoul (KR)

( * ) Notice: Subject to any disclaimer, the term of this patent is extended or adjusted under 35 U.S.C. 154(b) by 429 days.

(21) Appl. No.: 17/608,698

(22) PCT Filed: Apr. 27, 2020

(86) PCT No.: PCT/KR2020/005484
§ 371 (c)(1),
(2) Date: Nov. 3, 2021

(87) PCT Pub. No.: WO2020/231039
PCT Pub. Date: Nov. 19, 2020

(65) Prior Publication Data
US 2022/0237017 A1    Jul. 28, 2022

(30) Foreign Application Priority Data
May 14, 2019  (KR) ......................... 10-2019-0055971

(51) Int. Cl.
G06F 9/455  (2018.01)
G06F 9/50  (2006.01)
G06F 21/53  (2013.01)

(52) U.S. Cl.
CPC ........ G06F 9/45558 (2013.01); G06F 9/5077 (2013.01); G06F 9/5083 (2013.01); G06F 21/53 (2013.01); G06F 2009/4557 (2013.01); G06F 2009/45579 (2013.01); G06F 2209/505 (2013.01)

(58) Field of Classification Search
None
See application file for complete search history.

(56) References Cited

U.S. PATENT DOCUMENTS

| 8,930,693 | B2 * | 1/2015 | Holt | G06F 3/0644 |
| | | | | 713/168 |
| 9,781,122 | B1 | 10/2017 | Wilson et al. | |
| 2012/0233251 | A1 * | 9/2012 | Holt | G06F 16/27 |
| | | | | 709/204 |

(Continued)

FOREIGN PATENT DOCUMENTS

| KR | 10-2015-0142871 A | 12/2015 |
| KR | 10-1826498 B1 | 2/2018 |

OTHER PUBLICATIONS

Boskey Savla, VMware, "Federated Service Mesh on VMware PKS and VMware Cloud PKS". Dec. 10, 2018, [Retrieved on Nov. 2, 2021], Retrieved from <https://blogs.vmware.com/cloudnative/2018/12/10/service-mesh-cna>.

(Continued)

*Primary Examiner* — Adam Lee
(74) *Attorney, Agent, or Firm* — NKL Law; Jae Youn Kim (57) ABSTRACT

Provided is a distributed and associative container platform system which has an advantage of providing flexible movement of services and infinite extension of computing resources by interconnecting regionally distributed multiple container platforms and enhancing security.

11 Claims, 4 Drawing Sheets

(56) References Cited

U.S. PATENT DOCUMENTS

2012/0233463 A1\* 9/2012 Holt ..................... G06F 3/0631
   713/168
2022/0038289 A1\* 2/2022 Huang ................... G06F 16/27

OTHER PUBLICATIONS

Kim, Donggyeong. "LC3 Visiting Report", Aug. 7, 2018 [Retrieved on Nov. 2, 2021], Retrieved from <https://d2.naver.com/helloworld/9511142>.

\* cited by examiner

Policy-based Service mesh

Service mesh policy algorithm
- Operation/deployment policy algorithm analysis
- Service data collection/analysis metric definition

Policy algorithm-based service mesh
- Policy algorithm-based environment definition Configuration tool
- User/system policy Selection tool
- Service mesh structure/policy operation/deployment tool

Service mesh engine advancement
- Service mesh policy algorithm additional analysis/application
- Service mesh operation tool function addition

Cross cluster service template
- Operation/management policy-specific service Template providing/management
- Cross cluster template deployment/operation interface

Inter-cluster service interworking control
- Multi-cluster detection tool
- Cluster service interworking interface
- Multi-cluster service log collection tool
- Multi-cluster service log analysis tool

Cross cluster service integrated authentication
- Subsystem-specific authentication
- Service integrated authentication data management tool
- User/manager group authority
- User/manager group account management

FIG. 4

DISTRIBUTED AND ASSOCIATIVE CONTAINER PLATFORM SYSTEM

TECHNICAL FIELD

The present invention relates to a distributed and associative container platform system, and more particularly, to a distributed and associative container platform system capable of providing flexible movement of services and infinite extension of computing resources by interconnecting regionally distributed multiple container platforms and enhancing security.

BACKGROUND ART

Intelligent information services leading the 4th industrial revolution and large-scale wide area services such as smart city and the like require extensive regional computing resources for collecting, processing, and storing large-scale distributed data.

In order to overcome the limits of current centralized container platform structures, which are limited to cloud service mobility and resource extension in large-scale broadband service environments, there is a need for a distributed and associative container platform for providing flexible movement of services and infinite extension of computing resources by interconnecting regionally distributed multiple container platforms and enhancing security.

DISCLOSURE

Technical Problem

Therefore, the present invention is derived to solve the problems and an object of the present invention is to provide a distributed and associative container platform system capable of providing flexible movement of services and infinite extension of computing resources by interconnecting regionally distributed multiple container platforms and enhancing security.

However, technical objects of the present disclosure are not restricted to the technical object mentioned as above. Unmentioned technical objects will be apparently appreciated by those skilled in the art by referencing the following description.

Technical Solution

According to an exemplary embodiment of the present invention, there is provided a distributed and associative container platform system, comprising: a high performance security container unit having a security enhancement container module, an ultra-light virtual machine module, a virtual isolation execution module, a performance enhancement container module, a direct resource allocation module, a virtual network configuration module, a hierarchical storage interworking module, and an integrated storage interworking module; a distributed cluster federation unit classified into a multi-cluster federation unit and a container-based multi-cluster unit, wherein the multi-cluster federation unit comprises a cross cluster integrated resource • service template association module, a cross cluster integrated resource orchestration module, a single view-based integrated resource monitoring module, a cross cluster integrated resource • service mesh association module, a cross cluster service module, a policy-based load balancing/auto scaling, a multi-cluster service distribution/integration/movement module, a cross cluster integrated resource • service • integrated authentication association module, a cluster federation API server, and a cluster federation manager, and wherein the container-based multi-cluster unit comprises a multi-cluster resource abstraction module, a multi-cluster connecting structure module, an inter-cluster abstract resource service interworking module, a multi-cluster configuration/control module, a multi-cluster-based failover module, an inter-multi-cluster integrated storage application module, and a container orchestration and cluster management module; a policy-based service mesh unit comprising a service mesh policy algorithm module, a cross cluster service template module, a service configuration lightweight agent module, a policy algorithm-based service mesh engine module, an inter-cluster service interworking control module, a multi-cluster service detection module, a service mesh engine advancement module, a cross cluster service integrated authentication module, and a cluster service single authentication module, the policy-based service mesh unit being suitable for distributed cluster federation; and a distributed and associative service application • verification unit for providing cloud-based distributed and associative service application and verification utilizing the high performance security container unit, the distributed cluster federation unit, and the policy-based service mesh unit.

The security enhancement container module may include a container orchestration connection interface module, and an ultra-light VM/container isolation technology interworking interface module, the ultra-light virtual machine module includes a container high-speed execution module and a container-only lightweight virtual machine module, and the virtual isolation execution module includes a kernel-based container isolation module, and a namespace-based container isolation module.

The performance enhancement container module may include a container virtual hardware resource allocation tool module and a container virtual network configuration/operational management interface module, and the direct resource allocation module includes an ultra-light VM support virtual hardware resource interworking module, and an ultra-light VM support virtual hardware resource management module, and the virtual network configuration module includes a container-based virtual network module, and a virtual network dynamic configuration tool module.

The performance enhancement container module may include a global caching function storage container allocation/operation/management module, and a heterogeneous storage container allocation/operation/management module, and the hierarchical storage interworking module includes a performance-based container storage deployment tool module, and a container-based global caching management module, and the integrated storage interworking module includes a heterogeneous storage-based container recovery tool module, and a heterogeneous storage connection interface module.

The cross cluster integrated resource • service template association module may include a service template/integrated resource interworking interface, a integrated resource single view management tool, and an integrated resource status information storage management tool, and the cross cluster integrated resource orchestration module includes a resources and service status collection/analysis module, a management resource metadata analysis/management module, a cross cluster integrated resource configuration tool module, and a cross cluster integrated resource static batch module, and the single view-based integrated resource monitoring module includes an infrastructure management resource status information collection/analysis module, and an application resource status information collection/analysis module, the multi-cluster resource abstraction module includes a cluster resource pool management (addition/deletion/change) module, a cluster data collection/management tool module, and a cluster data analysis tool module, and the multi-cluster connecting structure module includes a cluster connection information management tool module, a inter-cluster connection/control interface module, and a multi-cluster connection interface module for providing a single view.

The cross cluster integrated resource • service mesh association module may include a service mesh association interworking interface module, a user/manager-based service mesh association module, and a service support service mesh interworking module, the cross cluster integrated resource orchestration module includes a real time resource status information collection/management module and a status information-based dynamic batch policy module, and the cross cluster service module includes a real time resource status information analysis/application module and a deployment application seamless automatic update module.

The policy-based load balancing/auto scaling module may include an inter-cross cluster dynamic batch executable module function module, and an infrastructure/application resource status change-based dynamic batch processing module, the inter-cluster abstract resource service interworking module includes an inter-cluster application static movement/management module, a multi-cluster authority integrated management module, and a cluster resource configuration change integrated management module, and the multi-cluster configuration/control module includes an account-specific cluster usage authority management module and an account-specific cluster configuration management module.

The cross cluster integrated resource • service • integrated authentication association module may include a user/manager workspace service single authentication module, a service support single authentication association module, and a service single authentication association interface module, the cross cluster service module includes a batch support analysis engine connection interface module, an analysis engine-based policy demonstration model module, and a service-based information collection/surveillance range control module, the multi-cluster service distribution/integration/movement module includes a multi-cluster service distribution tool module, an inter-multi-cluster service movement module, and a multi-cluster service integration/management module, the multi-cluster-based failover module includes a cluster failure monitoring tool module, a security violation access monitoring module, a cluster failure alarm/history management tool module, and a cluster change history management tool module, and the inter-multi-cluster integrated storage application module includes a container allocation storage inter-cluster sharing interface module and an inter-cluster image registry distribution management module.

The service mesh policy algorithm module may include an operation/deployment policy algorithm analysis module, and a service data collection/analysis metric definition module, and the cross cluster service template module includes an operation/management policy-specific service template for service template providing/management module, and a cross cluster template deployment/operation interface module.

The policy algorithm-based service mesh engine module may include a policy algorithm-based environment definition configuration tool module, a user/system policy selection tool module, and a service mesh structure policy operation/deployment tool module, and the inter-cluster service interworking control module includes a multi-cluster service detection tool module, a multi-cluster service log collection tool module, a cluster service interworking interface module, and a multi-cluster service log analysis tool module.

The service mesh engine advancement module may include a service mesh policy algorithm additional analysis/application module, and a service mesh operation tool function addition module, and the cross cluster service integrated authentication module includes a subsystem-specific authentication management tool module, a user/manager group authority management tool module, a service integrated authentication data management tool module, and a user/manager group account management tool module.

Advantageous Effects

According to the distributed and associative container platform system according to the present invention, it is possible to provide flexible movement of services and infinite extension of computing resources by interconnecting regionally distributed multiple container platforms and enhancing security.

MODES FOR THE INVENTION

Advantages and features of the present invention, and methods for accomplishing the same will be more clearly understood from exemplary embodiments described in detail below with reference to the accompanying drawings. However, the present invention is not limited to the embodiments set forth below, and may be embodied in various different forms. The present embodiments are just for rendering the disclosure of the present invention complete and are set forth to provide a complete understanding of the scope of the invention to a person with ordinary skill in the technical field to which the present invention pertains, and the present invention will only be defined by the scope of the claims.

Like reference numerals refer to like elements throughout the specification.

Hereinafter, a distributed and associative container platform system according to an embodiment of the present invention will be described with reference to the accompanying drawings.

At this time, each block of processing flowchart drawings and combinations of flowchart drawings will be understood to be performed by computer program instructions.

Since these computer program instructions may be mounted on processors of a general-purpose computer, a special-purpose computer or other programmable data processing devices, the instructions executed by the processors of the computer or other programmable data processing devices generate means of performing functions described in block(s) of the flowchart.

Since these computer program instructions may also be stored in computer-usable or computer-readable memory that may orientate a computer or other programmable data processing devices to implement a function by a specific method, the instructions stored in the computer-usable or computer-readable memory may produce a manufacturing item containing instruction means for performing the functions described in the block(s) of the flowchart.

Since the computer program instructions may also be mounted on the computer or other programmable data processing devices, a series of operational steps are performed on the computer or other programmable data processing devices to generate a process executed by the computer, so that the instructions performing the computer or other programmable data processing devices can provide steps for executing the functions descried in the block(s) of the flowchart.

Further, each block may represent a part of a module, a segment, or a code that includes one or more executable instructions for executing a specified logical function(s). It should also be noted that in some alternative embodiments, the functions mentioned in the blocks may occur out of order. For example, two successive illustrated blocks may in fact be performed substantially concurrently or the blocks may be sometimes performed in reverse order according to the corresponding function.

Figure 1:
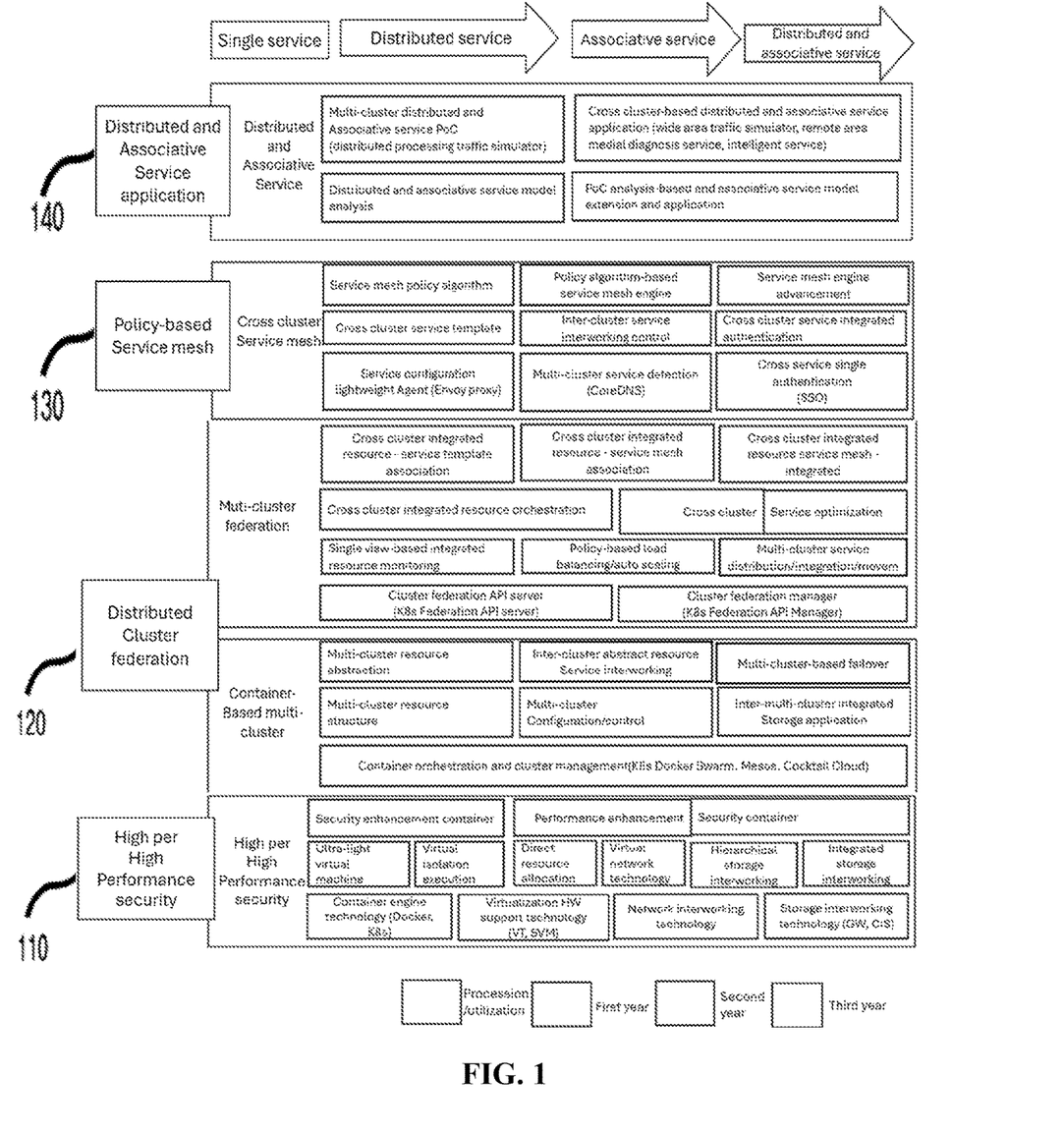
FIG. 1 is a schematic diagram of a distributed and associative container platform system according to an embodiment of the present invention.
Figure 2:
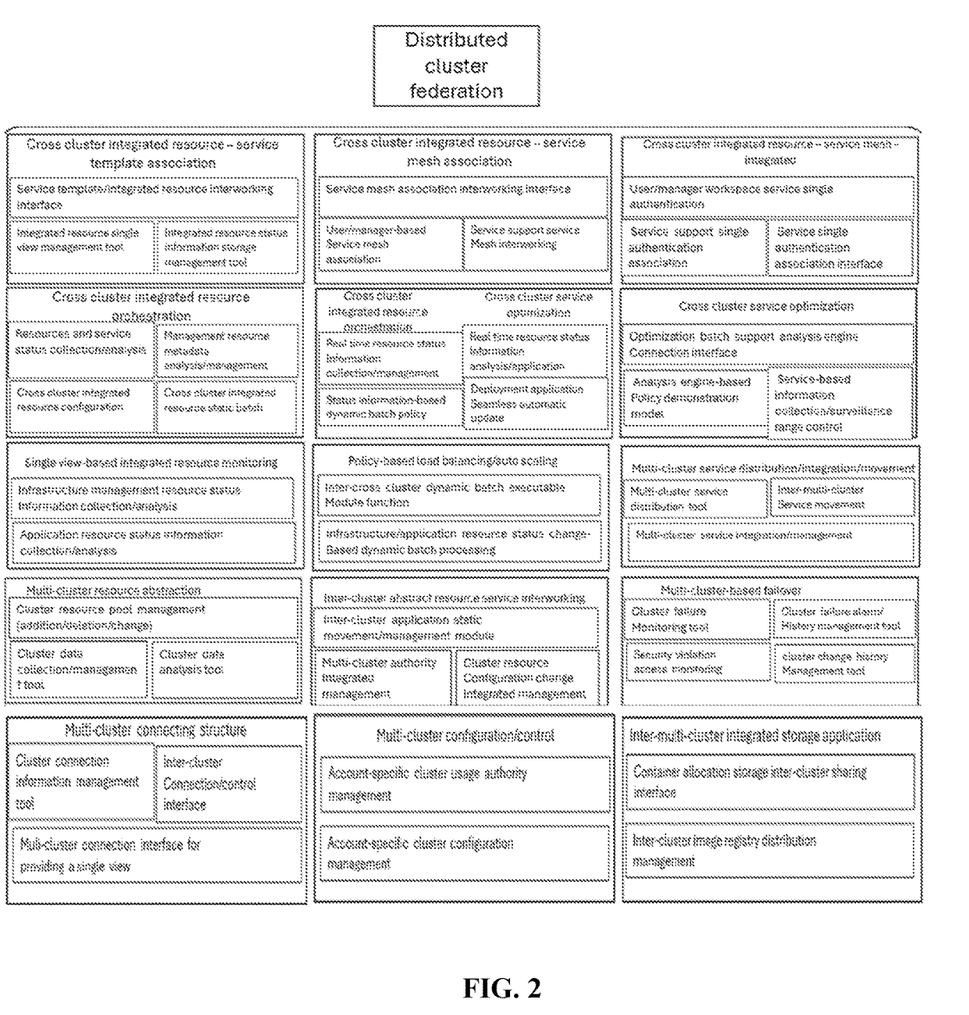
FIGS. 2 to 4 are detailed schematic diagrams of FIG. 1.
Figure 3:
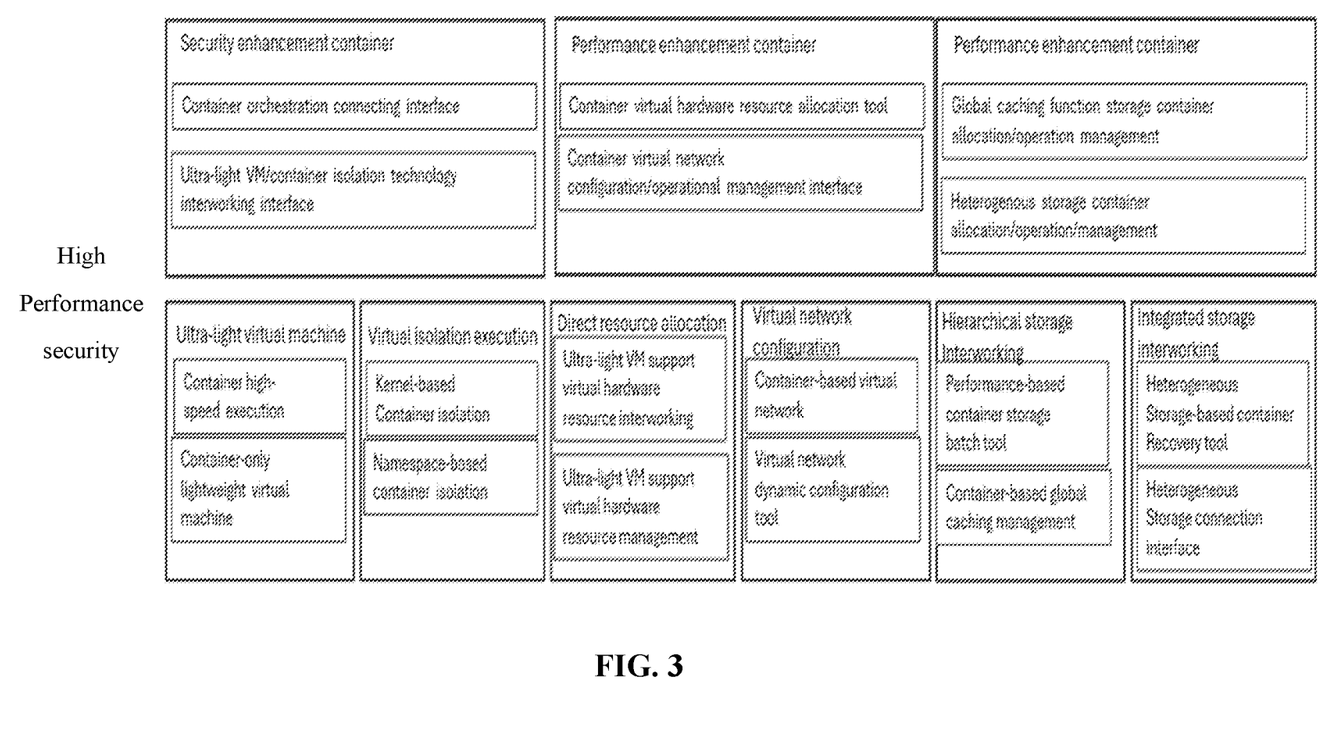
Figure 4:
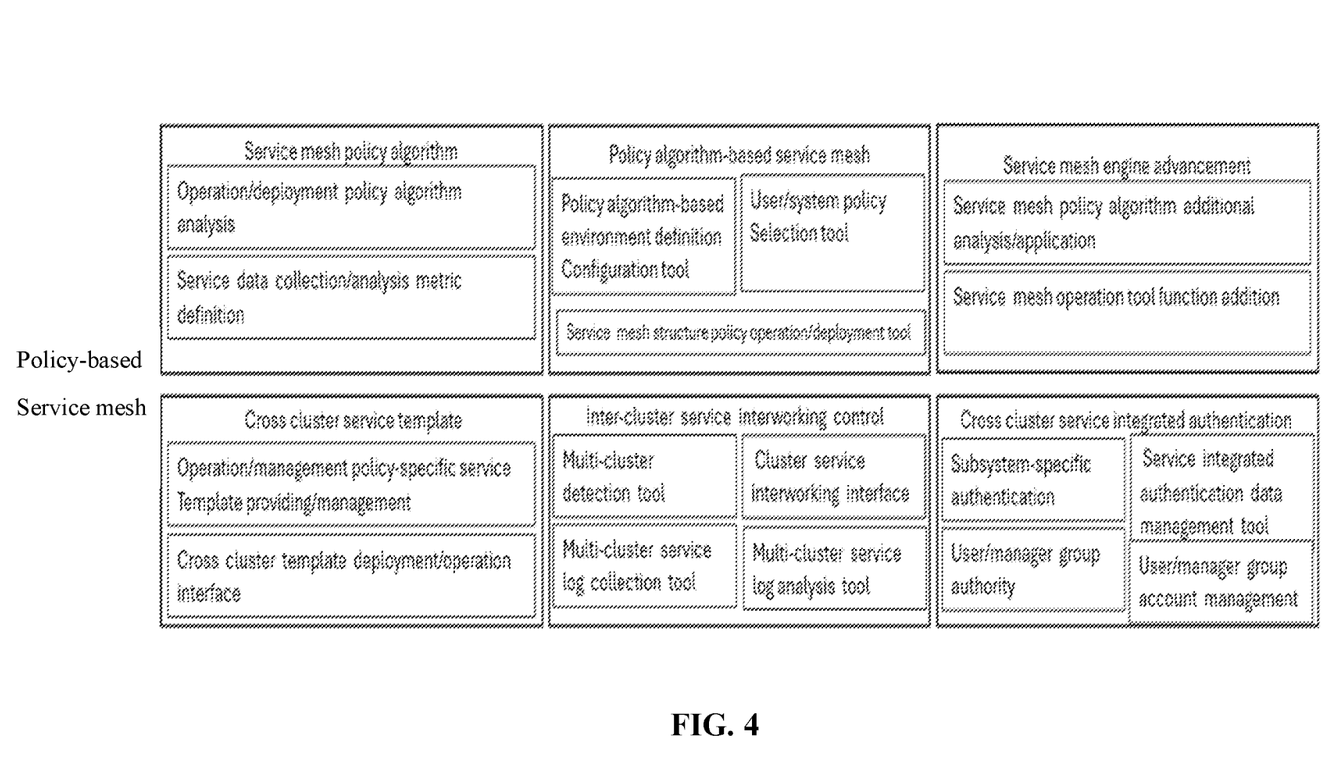

FIG. 1 is a schematic diagram of a distributed and associative container platform system according to an embodiment of the present invention and FIGS. 2 to 4 are detailed schematic diagrams of FIG. 1.

First, referring to FIG. 1, a distributed and associative container platform system according to an embodiment of the present invention includes a high performance security container unit 110, a distributed cluster federation unit 120, a policy-based service mesh unit 130, and a distributed and associative service application • verification unit 140.

The container platform is made based on a container and a container orchestration to provide an environment that automates the deployment and operation of applications. The container reduces the problem of infrastructure that can occur when deploying applications with operating system (OS) virtualization technology that creates an independent execution environment for each application. The container orchestration plays a role in consistently and stably integrating and managing numerous containers for using the container in a commercial environment.

The distributed and associative container platform system is a server-mounted software platform that interconnects container clusters which are regionally distributed and individually exist to provide infinite extension of cloud resources and flexible movement of services between clouds in a large-scale broadband service environment, provides a single computing infrastructure, enhance the container security, and provides resource integration and service optimization functions based thereon.

The high performance security container unit 110 may be module type software which solves isolation and security issues due to host kernel sharing of the container, and provides a container extension function that enhances performance and security using direct resource allocation and hierarchical storage technologies. The high performance security container unit 110 provides a kernel and namespace isolation function between ultra-light virtual machine-based containers, a direct virtualization resource allocation-based virtual network dynamic configuration function, and a connection function of a hierarchical storage and a heterogeneous integrated storage for performance-enhanced security containers. As a result, it is possible to be used as a container platform suitable for distributed and associative services regardless of security and network delays.

The high performance security container unit 110 includes a security enhancement container module, an ultra-light virtual machine module, a virtual isolation execution module, a performance enhancement container module, a direct resource allocation module, a virtual network configuration module, a hierarchical storage interworking module, and an integrated storage interworking module. The high performance security container unit 110 utilizes container engine techniques (Docker, K8s), virtualization HW support technology (VT, SVM), network interlocking technology (SDN, NFV), and storage interworking technology (GW, CIS).

The security enhancement container module includes a container orchestration connection interface module, and an ultra-light VM/container isolation technology interworking interface module, the ultra-light virtual machine module includes a container high-speed execution module and a container-only lightweight virtual machine module, and the virtual isolation execution module includes a kernel-based container isolation module, and a namespace-based container isolation module.

The performance enhancement container module includes a container virtual hardware resource allocation tool module and a container virtual network configuration/operational management interface module, and the direct resource allocation module includes an ultra-light VM support virtual hardware resource interworking module and an ultra-light VM support virtual hardware resource management module. The virtual network configuration module includes a container-based virtual network module, and a virtual network dynamic configuration tool module.

Further, the performance enhancement container module includes a global caching function storage container allocation/operation/management module, and a heterogeneous storage container allocation/operation/management module, and the hierarchical storage interworking module includes a performance-based container storage batch tool module, and a container-based global caching management module, and the integrated storage interworking module includes a heterogeneous storage-based container recovery tool module, and a heterogeneous storage connection interface module.

The distributed cluster federation unit 120 may be module type software that provides an integrated infrastructure management function of providing cross-cluster integrated resource orchestration and service optimization technology-based container arrangement • operation and automatic extension, and the like to provide a container-based multi-cluster as a single computing infrastructure and service environment. The distributed cluster federation unit 120 provides a container-based multi-cluster resource integration and cluster configuration/control/failover function, a multi-cluster federation support resource orchestration and service optimization function, and a cross-cluster integrated resource and service mesh and single authentication associative function. As a result, it is possible to be utilized as a distributed and associative container platform suitable for a service-scale wide area and a large-scale service microservice environment beyond the processing limit of a single container cluster and utilized as a platform suitable for various types of service models combined with the high performance security container.

The distributed cluster federation unit 120 is classified into a multi-cluster federation unit and a container-based multi-cluster unit. The multi-cluster federation unit includes a cross cluster integrated resource • service template association module, a cross cluster integrated resource orchestration module, a single view-based integrated resource monitoring module, a cross cluster integrated resource • service mesh association module, a cross cluster service module, a policy-based load balancing/auto scaling, a multi-cluster service distribution/integration/movement module, a cross cluster integrated resource • service • integrated authentication association module, a cluster federation API server, and a cluster federation manager. The container-based multi-cluster unit includes a multi-cluster resource abstraction module, a multi-cluster connecting structure module, an inter-cluster abstract resource service interworking module, a multi-cluster configuration/control module, a multi-cluster-based failover module, an inter-multi-cluster integrated storage application module, and a container orchestration and cluster management module.

The cross cluster integrated resource • service template association module includes a service template/integrated resource interworking interface, an integrated resource single view management tool, and an integrated resource status information storage management tool, and the cross cluster integrated resource orchestration module includes a resources and service status collection/analysis module, a management resource metadata analysis/management module, a cross cluster integrated resource configuration tool module, and a cross cluster integrated resource static batch module. The single view-based integrated resource monitoring module includes an infrastructure management resource status information collection/analysis module, and an application resource status information collection/analysis module, the multi-cluster resource abstraction module includes a cluster resource pool management (addition/deletion/change) module, a cluster data collection/management tool module, and a cluster data analysis tool module, and the multi-cluster connecting structure module includes a cluster connection information management tool module, a inter-cluster connection/control interface module, and a multi-cluster connection interface module for providing a single view.

The cross cluster integrated resource • service mesh association module includes a service mesh association interworking interface module, a user/manager-based service mesh association module, and a service support service mesh interworking module, the cross cluster integrated resource orchestration module includes a real time resource status information collection/management module and a status information-based dynamic batch policy module, and the cross cluster service module includes a real time resource status information analysis/application module and a deployment application seamless automatic update module.

The policy-based load balancing/auto scaling module includes an inter-cross cluster dynamic batch executable module function module, and an infrastructure/application resource status change-based dynamic batch processing module, the inter-cluster abstract resource service interworking module includes an inter-cluster application static movement/management module, a multi-cluster authority integrated management module, and a cluster resource configuration change integrated management module, and the multi-cluster configuration/control module includes an account-specific cluster usage authority management module and an account-specific cluster configuration management module.

The cross cluster integrated resource • service • integrated authentication association module includes a user/manager workspace service single authentication module, a service support single authentication association module, and a service single authentication association interface module. The cross cluster service module includes a batch support analysis engine connection interface module, an analysis engine-based policy demonstration model module, and a service-based information collection/surveillance range control module. The multi-cluster service distribution/integration/movement module includes a multi-cluster service distribution tool module, an inter-multi-cluster service movement module, and a multi-cluster service integration/management module. The multi-cluster-based failover module includes a cluster failure monitoring tool module, a security violation access monitoring module, a cluster failure alarm/history management tool module, and a cluster change history management tool module. The inter-multi-cluster integrated storage application module includes a container allocation storage inter-cluster sharing interface module and an inter-cluster image registry distribution management module.

The policy-based service mesh unit 130 may be module type software optimized for distributed cluster federation which solves runtime complexity of operating and a system of hundreds to thousands of instances for a large-scale broadband service and provides a dynamic network allocation-based microservice optimization infrastructure configuration function for supporting safely and rapidly a service configuration. The service mesh unit provides a policy algorithm-based service mesh feature for service configuration and resource allocation determination, and an inter-multi-cluster service interworking control and service integration authentication function. Accordingly, it is possible to be extended to a distributed and associative service platform optimized for a large-scale wide area service by securing policy algorithm-based service mesh technology which configures an optimal service in a container platform environment applied with distributed cluster federation technology and allocates integrated resources.

The policy-based service mesh unit 130 represents a cross cluster service mesh unit, and includes a service mesh policy algorithm module, a cross cluster service template module, a service configuration lightweight agent module, a policy algorithm-based service mesh engine module, an inter-cluster service interworking control module, a multi-cluster service detection module, a service mesh engine advancement module, a cross cluster service integrated authentication module, and a cluster service single authentication module.

The service mesh policy algorithm module includes an operation/deployment policy algorithm analysis module, and a service data collection/analysis metric definition module, and the cross cluster service template module includes an operation/management policy-specific service template providing/management module, and a cross cluster template deployment/operation interface module.

The policy algorithm-based service mesh engine module includes a policy algorithm-based environment definition configuration tool module, a user/system policy selection tool module, and a service mesh structure policy operation/deployment tool module, and the inter-cluster service interworking control module includes a multi-cluster service detection tool module, a multi-cluster service log collection tool module, a cluster service interworking interface module, and a multi-cluster service log analysis tool module.

The service mesh engine advancement module includes a service mesh policy algorithm additional analysis/application module, and a service mesh operation tool function addition module, and the cross cluster service integrated authentication module includes a subsystem-specific authentication management tool module, a user/manager group authority management tool module, a service integrated authentication data management tool module, and a user/manager group account management tool module.

The distributed and associative service application • verification unit 140 provides cloud-based distributed and associative service application • verification using a distributed and associative container platform. The distributed and associative service application • verification unit 140 provides a cloud-based wide area traffic simulation use case application and verification, multi-cluster federation-based remote medical service use case application and verification, and distributed and associative container platform-based cloud integrated resource management use case applicable and verification. The distributed and associative service application • verification unit 140 enables distributed association of services through the utilization of wide-range regional computing resources by applying a distributed and associative container platform to processing a large amount of regionally distributed data such as an intelligent information service and smart cities and providing high quality services.

Accordingly, the present invention provides a distributed and associative service platform which supports a distributed and associative service infrastructure for various independent objects such as regionally distributed large-scale users, sensors, control devices, machines, and computing resources. The present invention may be applied to intelligent information services by providing a computing infrastructure for large-scale wide area services which are regionally distributed and require extension, such as individual vehicles of smart traffic, individual citizens of smart city, and unmanned moving bodies of autonomous driving. The present invention may provide a distributed and associative service platform for supporting large-scale wide area simulation required for accommodating regionally distributed large-scale independent objects, such as various sensors, mobile bodies, persons, and digital twin of smart city. The present invention may provide local high-quality services to service consumers by moving • arranging cloud services at high speed regardless of regions using a distributed and associative container platform. The present invention may provide a distributed and associative container platform that supports high-speed movement and arrangement for regionally distributed resources and services to provide real-time control services regardless of regions for unmanned air vehicles for various industries such as exploration • surveillance • agriculture • courier, etc. and unmanned air vehicles for disaster prevention and response • exploration • savings and military.

Meanwhile, the embodiments of the present invention may be prepared by a computer executable program and implemented by a universal digital computer which operates the program by using a computer readable recording medium. The computer readable recording medium includes storage media such as magnetic storage media (e.g., a ROM, a floppy disk, a hard disk, and the like), optical reading media (e.g., a CD-ROM, a DVD, and the like), and a carrier wave (e.g., transmission through the Internet).

As such, according to the distributed and associative container platform system of the present invention, it is possible to apply and verify resource abstraction and failover support container-based multi-cluster, multi-cluster federation for integrated resource management and service optimization, policy-based service mesh optimized for distributed cluster federation, and distributed and associative container platform-based cloud services. Further, it is possible to provide security through container batch policy support on a multi-container cluster, inter-multi cluster movement of container-based services, container support cloud infrastructure interworking, and host kernel separation and provide a performance enhancement container based on direct resource allocation. Further, it is possible to apply and verify orchestration which integrates resources on a multi-container cluster, load balancing and auto scaling for service optimization on a multi-container cluster, policy-based service mesh for inter-cross cluster service interworking, inter-cross cluster service integration authentication, and multi-cluster-based distributed and associative services.

The present disclosure has been described above with reference to preferred embodiments thereof. It will be understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is illustrated by the appended claims rather than by the foregoing description, and all differences within the scope of equivalents thereof should be construed as being included in the present invention.

The invention claimed is:

1. A distributed and associative container platform system, comprising:
   a computer processor;
   a cluster federation API server;
   a high performance security container unit having a security enhancement container module, an ultra-light virtual machine module, a virtual isolation execution module, a performance enhancement container module, a direct resource allocation module, a virtual network configuration module, a hierarchical storage interworking module, and an integrated storage interworking module;
   a distributed cluster federation unit classified into a multi-cluster federation unit and a container-based multi-cluster unit, wherein the multi-cluster federation unit comprises a cross cluster integrated resource service template association module, a cross cluster integrated resource orchestration module, a single view-based integrated resource monitoring module, a cross cluster integrated resource service mesh association module, a cross cluster service module, a policy-based load balancing/auto scaling module, a multi-cluster service distribution/integration/movement module, a cross cluster integrated resource service integrated authentication association module, and a cluster federation manager, and wherein the container-based multi-cluster unit comprises a multi-cluster resource abstraction module, a multi-cluster connecting structure module, an inter-cluster abstract resource service interworking module, a multi-cluster configuration/control module, a multi-cluster-based failover module, an inter-multi-cluster integrated storage application module, and a container orchestration and cluster management module;
   a policy-based service mesh unit comprising a service mesh policy algorithm module, a cross cluster service template module, a service configuration lightweight agent module, a policy algorithm-based service mesh engine module, an inter-cluster service interworking control module, a multi-cluster service detection module, a service mesh engine advancement module, a cross cluster service integrated authentication module, and a cluster service single authentication module, the policy-based service mesh unit being suitable for distributed cluster federation; and a distributed and associative service application verification unit for providing a cloud-based distributed and associative service application and verification utilizing the high performance security container unit, the distributed cluster federation unit, and the policy-based service mesh unit.

2. The distributed and associative container platform system of claim 1, wherein the security enhancement container module includes a container orchestration connection interface module, and a ultra-light VM/container isolation technology interworking interface module, the ultra-light virtual machine module includes a container high-speed execution module and a container-only lightweight virtual machine module, and the virtual isolation execution module includes a kernel-based container isolation module, and a namespace-based container isolation module.

3. The distributed and associative container platform system of claim 1, wherein the performance enhancement container module includes a container virtual hardware resource allocation tool module and a container virtual network configuration/operational management interface module, and the direct resource allocation module includes an ultra-light VM support virtual hardware resource interworking module, and an ultra-light VM support virtual hardware resource management module, and the virtual network configuration module includes a container-based virtual network module, and a virtual network dynamic configuration tool module.

4. The distributed and associative container platform system of claim 1, wherein the performance enhancement container module includes a global caching function storage container allocation/operation/management module, and a heterogeneous storage container allocation/operation/management module, and the hierarchical storage interworking module includes a performance-based container storage deployment tool module, and a container-based global caching management module, and the integrated storage interworking module includes a heterogeneous storage-based container recovery tool module, and a heterogeneous storage connection interface module.

5. The distributed and associative container platform system of claim 1, wherein the cross cluster integrated resource service template association module includes a service template/integrated resource interworking interface, an integrated resource single view management tool, and an integrated resource status information storage management tool, and the cross cluster integrated resource orchestration module includes a resources and service status collection/analysis module, a management resource metadata analysis/management module, a cross cluster integrated resource configuration tool module, and a cross cluster integrated resource static batch module, and the single view-based integrated resource monitoring module includes an infrastructure management resource status information collection/analysis module, and an application resource status information collection/analysis module, the multi-cluster resource abstraction module includes a cluster resource pool management module, a cluster data collection/management tool module, and a cluster data analysis tool module, and the multi-cluster connecting structure module includes a cluster connection information management tool module, an inter-cluster connection/control interface module, and a multi-cluster connection interface module for providing a single view.

6. The distributed and associative container platform system of claim 1, wherein the cross cluster integrated resource service mesh association module includes a service mesh association interworking interface module, a user/manager-based service mesh association module, and a service support service mesh interworking module, the cross cluster integrated resource orchestration module includes a real time resource status information collection/management module and a status information-based dynamic batch policy module, and the cross cluster service module includes a real time resource status information analysis/application module and a deployment application seamless automatic update module.

7. The distributed and associative container platform system of claim 1, wherein the policy-based load balancing/auto scaling module includes an inter-cross cluster dynamic batch executable module function module, and an infrastructure/application resource status change-based dynamic batch processing module, the inter-cluster abstract resource service interworking module includes an inter-cluster application static movement/management module, a multi-cluster authority integrated management module, and a cluster resource configuration change integrated management module, and the multi-cluster configuration/control module includes an account-specific cluster usage authority management module and an account-specific cluster configuration management module.

8. The distributed and associative container platform system of claim 1, wherein the cross cluster integrated resource service integrated authentication association module includes a user/manager workspace service single authentication module, a service support single authentication association module, and a service single authentication association interface module, the cross cluster service module includes a batch support analysis engine connection interface module, an analysis engine-based policy demonstration model module, and a service-based information collection/surveillance range control module, the multi-cluster service distribution/integration/movement module includes a multi-cluster service distribution tool module, an inter-multi-cluster service movement module, and a multi-cluster service integration/management module, the multi-cluster-based failover module includes a cluster failure monitoring tool module, a security violation access monitoring module, a cluster failure alarm/history management tool module, and a cluster change history management tool module, and the inter-multi-cluster integrated storage application module includes a container allocation storage inter-cluster sharing interface module and an inter-cluster image registry distribution management module.

9. The distributed and associative container platform system of claim 1, wherein the service mesh policy algorithm module includes an operation/deployment policy algorithm analysis module, and a service data collection/analysis metric definition module, and the cross cluster service template module includes an operation/management policy-specific service template for service template providing/management module, and a cross cluster template deployment/operation interface module.

10. The distributed and associative container platform system of claim 1, wherein the policy algorithm-based service mesh engine module includes a policy algorithm-based environment definition configuration tool module, a user/system policy selection tool module, and a service mesh structure policy operation/deployment tool module, and the inter-cluster service interworking control module includes a multi-cluster service detection tool module, a multi-cluster service log collection tool module, a cluster service interworking interface module, and a multi-cluster service log analysis tool module.

11. The distributed and associative container platform system of claim 1, wherein the service mesh engine advancement module includes a service mesh policy algorithm additional analysis/application module, and a service mesh operation tool function addition module, and the cross cluster service integrated authentication module includes a subsystem-specific authentication management tool module, a user/manager group authority management tool module, a service integrated authentication data management tool module, and a user/manager group account management tool module.

\* \* \* \* \*